(12) United States Patent
Daigneault et al.

(10) Patent No.: US 11,820,372 B2
(45) Date of Patent: Nov. 21, 2023

(54) TOW WEIGHT EVALUATION SYSTEM FOR WRECKERS

(71) Applicant: INDUSTRIES N.R.C. INC, Saint-Paul-d'Abbotsford (CA)

(72) Inventors: Sébastien Daigneault, Roxton Pond (CA); Francis Dionne, Saint-Jean-sur-Richelieu (CA); Philippe Giguère, Granby (CA); Normand Caron, Granby (CA)

(73) Assignee: INDUSTRIES N.R.C. INC, Saint-Paul-d'Abbotsfo (CA)

( * ) Notice: Subject to any disclaimer, the term of this patent is extended or adjusted under 35 U.S.C. 154(b) by 405 days.

(21) Appl. No.: 17/022,582

(22) Filed: Sep. 16, 2020

(65) Prior Publication Data

US 2021/0078576 A1 Mar. 18, 2021

Related U.S. Application Data

(60) Provisional application No. 62/901,846, filed on Sep. 18, 2019.

(51) Int. Cl.
*B60W 30/14* (2006.01)
*B60P 3/12* (2006.01)
(Continued)

(52) U.S. Cl.
CPC ............ *B60W 30/146* (2013.01); *B60P 3/12* (2013.01); *B60W 10/22* (2013.01); *B60W 2050/143* (2013.01)

(58) Field of Classification Search
CPC . B60W 30/146; B60W 2050/146; B60P 3/12; G01G 19/00; G01G 19/18
See application file for complete search history.

(56) References Cited

U.S. PATENT DOCUMENTS 4,103,752 A 8/1978 Schmidt
4,230,196 A 10/1980 Snead
(Continued)

FOREIGN PATENT DOCUMENTS

DE 102012109530 A1 * 4/2014 ............ B66F 17/003
EP 2105717 9/2009
(Continued)

OTHER PUBLICATIONS

Real Time Weighing for Truck and Trailers; https://rmtequip.com/en/products/brt-5; 4 pages.
(Continued)

*Primary Examiner* — Lindsay M Low
*Assistant Examiner* — Omar Morales
(74) *Attorney, Agent, or Firm* — BENOIT & COTE, INC.; Ibrahim Tamer; Mathieu Audet

(57) ABSTRACT

A tow aid system used while operating a wrecker adapted to tow a vehicle, the wrecker comprising an underlift arm extending rearward from the wrecker, wherein the underlift arm is adapted to lift at least a part of the vehicle for towing. The tow aid system comprises: axle load sensors mounted along different longitudinal positions on the wrecker, the axle load sensors generating signals indicative of loads along the different longitudinal positions; an underlift arm load sensor mounted about the underlift arm, the underlift arm load sensor generating signals indicative of a load applied on the underlift arm while holding the vehicle in a towing position; and a controller processing the signals from the axle load sensors and the underlift arm load sensor to calculate operating limits of the wrecker.

16 Claims, 11 Drawing Sheets

(51) Int. Cl.
*B60W 50/14* (2020.01)
*B60W 10/22* (2006.01)

(56) References Cited

U.S. PATENT DOCUMENTS

| | | | |
|---|---|---|---|
| 5,070,953 A | 12/1991 | Kyrtsos et al. | |
| 5,178,226 A | 1/1993 | Bowman et al. | |
| 9,464,403 B2 | 10/2016 | Shatters | |
| 2005/0203684 A1* | 9/2005 | Borgesson | B60K 35/00 701/1 |
| 2008/0279667 A1 | 11/2008 | Addleman et al. | |
| 2012/0024081 A1* | 2/2012 | Baker | G01L 5/136 280/511 |
| 2013/0253814 A1* | 9/2013 | Wirthlin | G01G 19/02 701/1 |
| 2015/0107564 A1* | 4/2015 | Itoh | F02D 41/0007 123/559.1 |

FOREIGN PATENT DOCUMENTS

| | | | | |
|---|---|---|---|---|
| GB | 2340568 A | * | 2/2000 | B60T 8/18 |
| GB | 2348508 A | * | 10/2000 | G01G 19/12 |
| JP | H05199620 A | * | 8/1993 | |
| JP | H10910 A | * | 1/1998 | |
| JP | 10253431 A | * | 9/1998 | |
| JP | 4037990 B2 | * | 1/2008 | |
| WO | WO-8910284 A1 | * | 11/1989 | |
| WO | 2016163874 | | 10/2016 | |

OTHER PUBLICATIONS

Real Time Weighing for Truck and Trailers; https://rmtequip.com/en/products/brt-5; 3 pages.
Wireless weight monitoring; https://clearl.com; 1 page.
Helper X Logo The best in cab helper an operator can get; https://rmtequip.com/en/products/helper-x; 4 pages.
Introducing Appweigh; https://appweigh.com/; 6 pages.
On-Board Wireless Truck Scales; https://truckweight.com/; 4 pages.
RMT innovates with an optical laser conveyor scale! https://rmtequip.com/fr/; 1 page.
Onboard load scales that save you time and money; https://www.rwls.com/; 6 pages.
Sentinel; http://www.cleral.com/cmsnc3images/image/sentinel_big_web.jpg; 1 page.
Tow Performance Calculator—Jerr-Dan; https://www.jerrdan.com/calculator; 3 pages.

* cited by examiner

YOUR RESULTS

0% ———————— 100%

Tow Performance with a 50% Steer Axle Target ?
Retracted ____ Lbs  Extended ____ Lbs Tow Performance based on Gross Axle Weight Rating ?
Retracted ____ Lbs  Extended ____ Lbs Tow Performance ?
Retracted ____ Lbs  Extended ____ Lbs Axle Load Retracted ?
Front ____ Lbs      Rear ____ Lbs Axle Load Extended ?
Front ____ Lbs      Rear ____ Lbs Click on entry to make an update to selected field What is your Front Axle Weight (FAW) ?
[____] Lbs What is your Wheelbase ?
[____] Inches What is your Rear Axle Weight (RAW) ?
[____] Lbs What is your Allowable Rear Tandem Load ?
[____] Lbs What is your Retracted Length of Overhang ?
[____] Inches What is your Extended Length of Overhang ?
[____] Inches

[ CALCULATE ]

These Calculations are estimations; Chassis and equipment specifications will also affect towing performance

FIG. 1

(PRIOR ART)

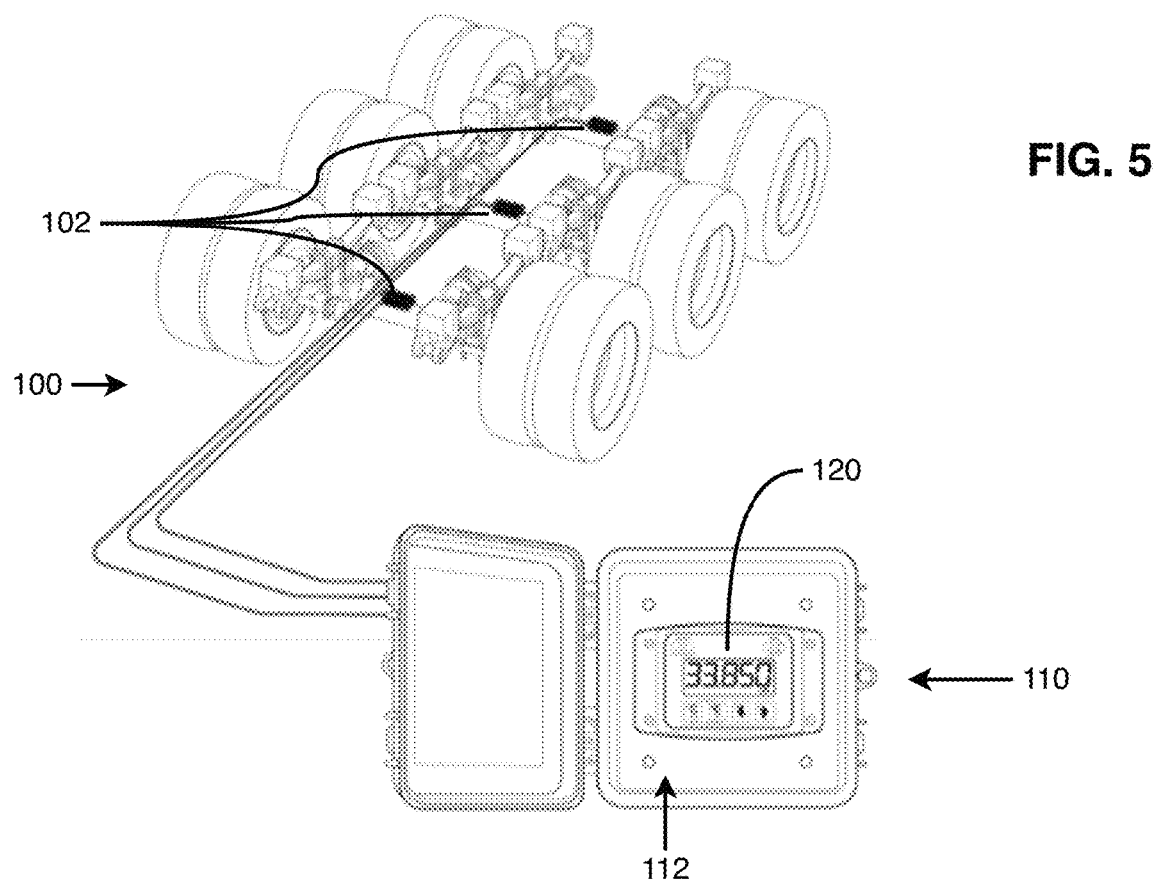
FIG. 5
**FIG. 6
(PRIOR ART)**
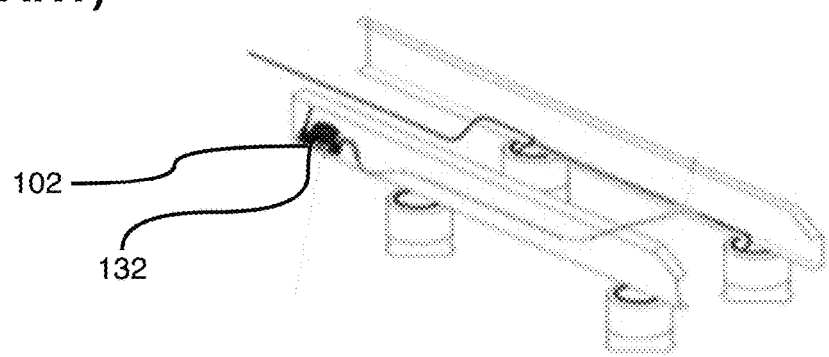

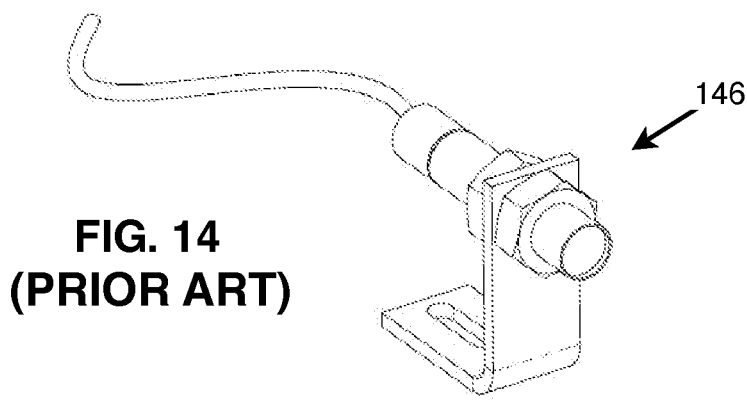
FIG. 14 (PRIOR ART)
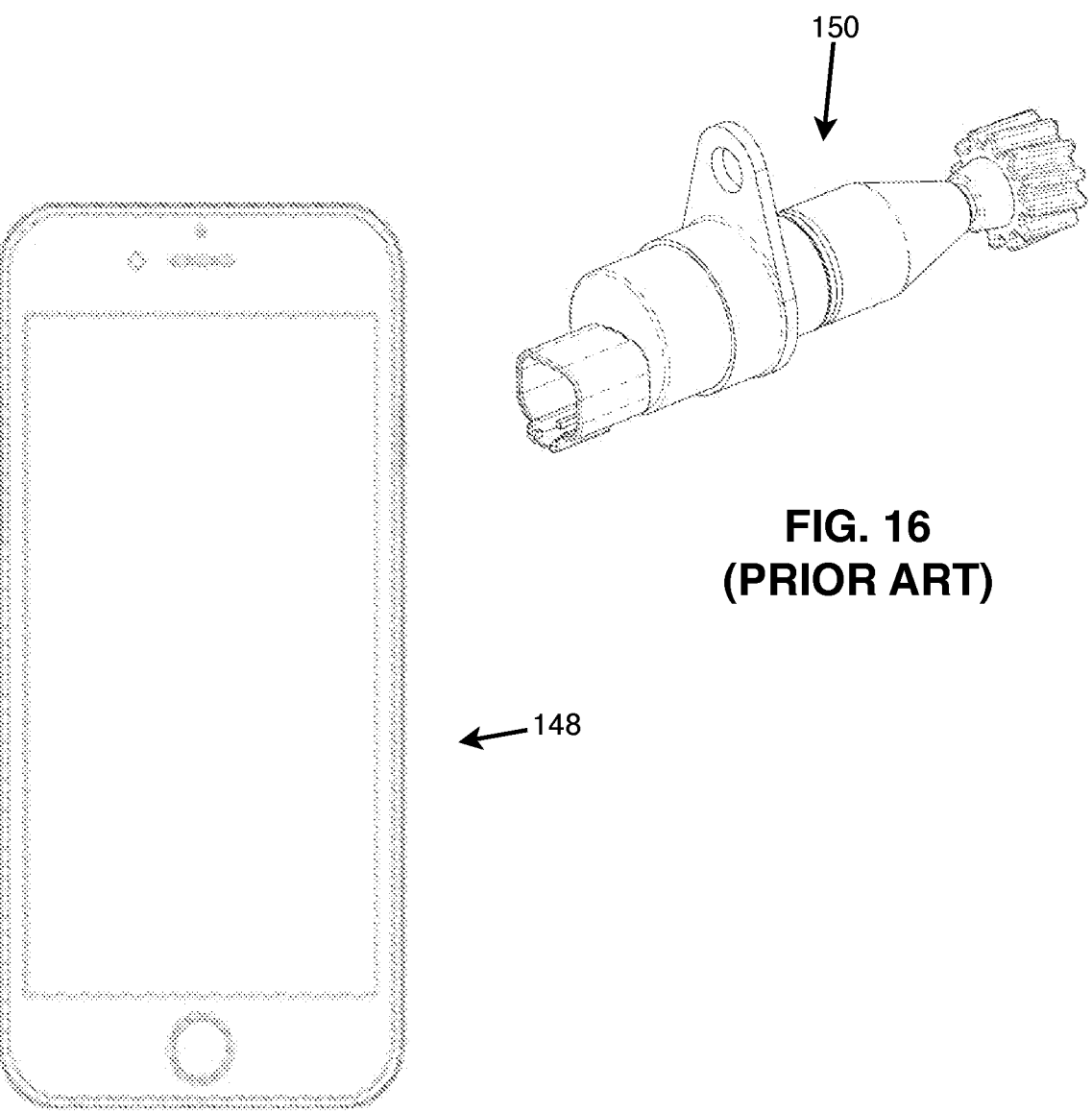
FIG. 15
FIG. 16 (PRIOR ART)

TOW WEIGHT EVALUATION SYSTEM FOR WRECKERS

CROSS-REFERENCE TO RELATED APPLICATION

This application claims priority from U.S. provisional patent application 62/901,846 filed Sep. 18, 2019, the specification of which is hereby incorporated herein by reference in its entirety.

BACKGROUND

(a) Field

The subject matter disclosed generally relates to towing vehicles. More particularly, the subject matter disclosed relates to towing vehicle tow weight evaluation, as well as indicators and controls associated therewith.

(b) Related Prior Art

In the field of recovery vehicles, there are recovery vehicles with masts and booms, a.k.a. tow vehicles or wreckers, including those that can be rotated, a.k.a. rotating wreckers, as well as those which cannot be rotated, and whose supporting travel base can be moved along the longitudinal axis of the wrecker to increase the reach of the boom. Such large wreckers, a.k.a. heavy wreckers, allow a large load to be lifted and then moved a given distance about the wrecker using hydraulic power.

Such recovery vehicles are for moving the recovered vehicle out of the way, which is frequently performed by towing the vehicle from the wrecking location to a repair location. The wreckers are designed to be able to tow vehicles with a maximum mass, and particularly designed to have a maximum lifted load supported by the towing arm or boom during the towing process.

Other types of recovery vehicles include platform vehicles, e.g., flatbed recovery vehicles, adapted to transport vehicles. Recovery vehicles, with or without masts, booms, or a platform, comprise an underlift which lifts at least a portion of the vehicle to be transported. The transported vehicles are temporarily secured to the underlift and afterward moved away from the wreckage or pickup location.

All vehicles described above are intended to be covered by the term "wrecker" in the present document, whether or not the wrecker comprises a boom or a platform unless otherwise specified so long as they include an underlift.

Practically, the towed mass and the lifted mass are frequently unknown or at least approximative, due to the variable nature of the towed vehicles and the conditions of the towed vehicles.

Further, the conditions in which towing is performed vary. For instance, the extent of the towing arm may vary from one towing situation to the other, influencing the maximum towing capability of the wrecker.

Practically, wrecker operators frequently use operator charts provided with the wrecker or web-based tow performance calculator (see FIG. 1) wherein the operators enter the characteristics of the wrecker and the tow performance calculator provides the performances (aka operating conditions) for the wreckers to operate within since the towed mass and lifted mass affect the operation of the wreckers, e.g., weight on the different axles of the wrecker, the minimum braking distance of the wrecker, maximum safe speed of the wrecker, etc.

Accordingly, it would be desirable to improve the knowledge provided to the wrecker operators such as the safety systems in the wreckers in order to effectively respond to the variable towing masses to operate with and the variable towing conditions. It would therefore be also advantageous to provide wrecker controls that provide security improvements. It would further be desirable to provide dynamic data that can reflect changes in the towed vehicle such as the condition of the towing and the conditions of operation.

Further, it would be desirable to provide a system that is operable both on a wrecker as will be described herein as well as on other heavy-weight vehicles wherein the load to be received needs to be monitored, for example platform trucks adapted to transport vehicles.

SUMMARY

According to an embodiment, there is provided a tow aid system used while operating a wrecker adapted to tow a vehicle, the wrecker comprising an underlift arm extending rearward from the wrecker, wherein the underlift arm is adapted to lift at least a part of the vehicle for towing, the tow aid system comprising: axle load sensors mounted along different longitudinal positions on the wrecker, the axle load sensors generating signals indicative of loads along the different longitudinal positions; an underlift arm sensor mounted about the underlift arm, the underlift arm sensor generating signals indicative of at least one of a load applied on the underlift arm and an extension distance of the underlift arm while holding the vehicle in a towing position; and a controller processing the signals from the axle load sensors and the underlift arm sensor to calculate load conditions and to determine whether the load condition are within operating limits of the wrecker.

According to an aspect, the controller further processes signals from the axle load sensors and the underlift arm load sensor to calculate load conditions of the wrecker which comprise at least one of effective payload on the underlift arm, effective load on a front axle and effective load on a rear axle.

According to an aspect, the controller further processes signals from the axle load sensors and the underlift arm load sensor to calculate the operating limits of the wrecker which comprise at least one of: maximum underlift arm payload weight, minimum front axle weight, maximum front axle weight, maximum rear axle weight and maximum speed of the vehicle.

According to an aspect, the tow aid system further comprises a display for displaying at least one of the load conditions and the operating limits.

According to an aspect, the tow aid system further comprises a speed sensor to detect the speed of the vehicle and wherein the tow aid system further comprises an audio signal component to provide an audio alarm when load conditions or speed are outside the operating limits.

According to an aspect, the wrecker further comprises a front axle on which is mounted a front axle load sensor and a rear axle on which is mounted a rear axle load sensor.

According to an aspect, the tow aid system further comprises a register storing over time a log of at least one of: tare weights at each load sensor; the load conditions; the loads on the front axle; the loads on the rear axle; and the loads on the underlift arm.

According to an aspect, the wrecker comprises a plurality of riggers, and wherein the tow aid system comprises rigger sensors monitoring and signaling loads undergone by the riggers.

According to an aspect, the tow aid system further comprises an interlock system limiting speed of the wrecker based on the calculated operating limits.

According to an aspect, the sensors comprise at least one of a pneumatic pressure sensor, a hydraulic pressure sensor, a strain gauge and an angular detection sensor.

According to an embodiment, there is provided a method for providing an aid for operating a wrecker adapted to tow a vehicle wherein the wrecker comprises a front axle, a rear axle and an underlift arm, the underlift arm extending rearward from the wrecker, wherein the underlift arm is adapted to lift at least a part of the vehicle for towing, the method comprising: a) generating sensor signals representative of: i) a load on exerted by the vehicle on the underlift arm; ii) an extension distance of the underlift arm; and iii) an load exerted on at least one of the front axle and the rear axle; and b) processing the sensor signals to calculate load conditions and to determine whether the load conditions are within operating limits of the wrecker under the load conditions.

According to an aspect, the method further comprises: at least one of: displaying at least one of the load conditions and the operating limits; and limiting at least one of speed of the wrecker and position of the underlift arm.

According to an aspect, the method further comprises storing over time in a memory a plurality of load conditions undergone by the wrecker.

According to an aspect, the step of processing the sensor signals to determine whether the load conditions are within the operating limits comprises calculating at least one of maximum underlift arm payload weight, minimum front axle weight, maximum front axle weight, maximum rear axle weight and maximum speed of the vehicle.

According to an aspect, the step of processing the sensor signals to calculate load conditions comprises determining at least one of effective payload on the underlift arm, effective load on the front axle and effective load on the rear axle.

According to an aspect, the step of limiting a speed of the wrecker comprises preventing the wrecker from moving unless the speed of the wrecker or the load conditions are within the operating limits.

According to an aspect, the step of processing signals comprises the step of calculating a total weight of the wrecker before the vehicle is lifted by the underlift arm, calculating a total weight when the vehicle is lifted by the underlift arm, and at least one of: i) calculating a load axle lift; and ii) calculating a length of the axle lift.

According to an embodiment, there is provided payload evaluation system for a wrecker adapted to tow a vehicle, the wrecker comprising a chassis, a front axle, a rear axle and at least one of: a platform mounted to the chassis adapted to temporarily mount the towed vehicle; and an underlift arm extending rearward from the chassis adapted at least partially lift the vehicle, wherein the wrecker in under a load condition when either the vehicle is mounted to the platform or the vehicle is attached to underlift arm, wherein the payload evaluation system comprising: a front axle load sensor mounted about the front axle and adapted for generating signals indicative of a load exerted on the front axle; a rear axle load sensor mounted about the rear axle and adapted for generating signals indicative of a load exerted on the rear axle; a controller processing signals generated by the sensors when not under the load condition and when under the load condition and for establishing a payload therefrom; and a display, in communication with the controller, for displaying the payload associated with the load condition and load exerted by the axles of the wrecker.

According to an aspect, the payload evaluation system further comprises an underlift arm sensor monitoring weight undergone by the underlift arm.

According to an aspect, the payload evaluation system further comprises a speed sensor for sensing speed of the wrecker, and interlock system for limiting speed of the wrecker based on at least one of the load condition, the load exerted by the front axle, and the load exerted by the rear axle.

According to an aspect, the payload evaluation system further comprises a memory for storing over time a log of load conditions undergone by the wrecker.

According to an embodiment, there is provided a tow aid system used while operating a wrecker adapted to tow a vehicle, the wrecker comprising an underlift arm extending rearward from the wrecker, wherein the underlift arm is adapted to lift at least a part of the vehicle for towing, the tow aid system comprising: an underlift arm sensor mounted about the underlift arm, the underlift arm sensor generating signals indicative of at least one of a load applied on the underlift arm and an extension distance of the underlift arm while holding the vehicle in a towing position; and a controller processing the signals from the underlift arm sensor to calculate load conditions and to determine whether the load conditions are within operating limits of the wrecker.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 1 is a printout of a web-based tow performance calculator of the PRIOR ART;

FIG. 5 a schematic view of a portion of a wrecker frame and axle with block depiction of gauges or sensors mounted to the chassis and/or axles and of a control and/or display panel associated thereto;

FIGS. 6 to 14 and 16 are illustrations of exemplary sensors that can be used in realizations of a tow weight evaluation, mounted or not to a chassis or the underlift arm;

FIG. 15 is a schematic of an exemplary wireless remote device;

It will be noted that throughout the appended drawings, like features are identified by like reference numerals.

DETAILED DESCRIPTION

Figure 2:
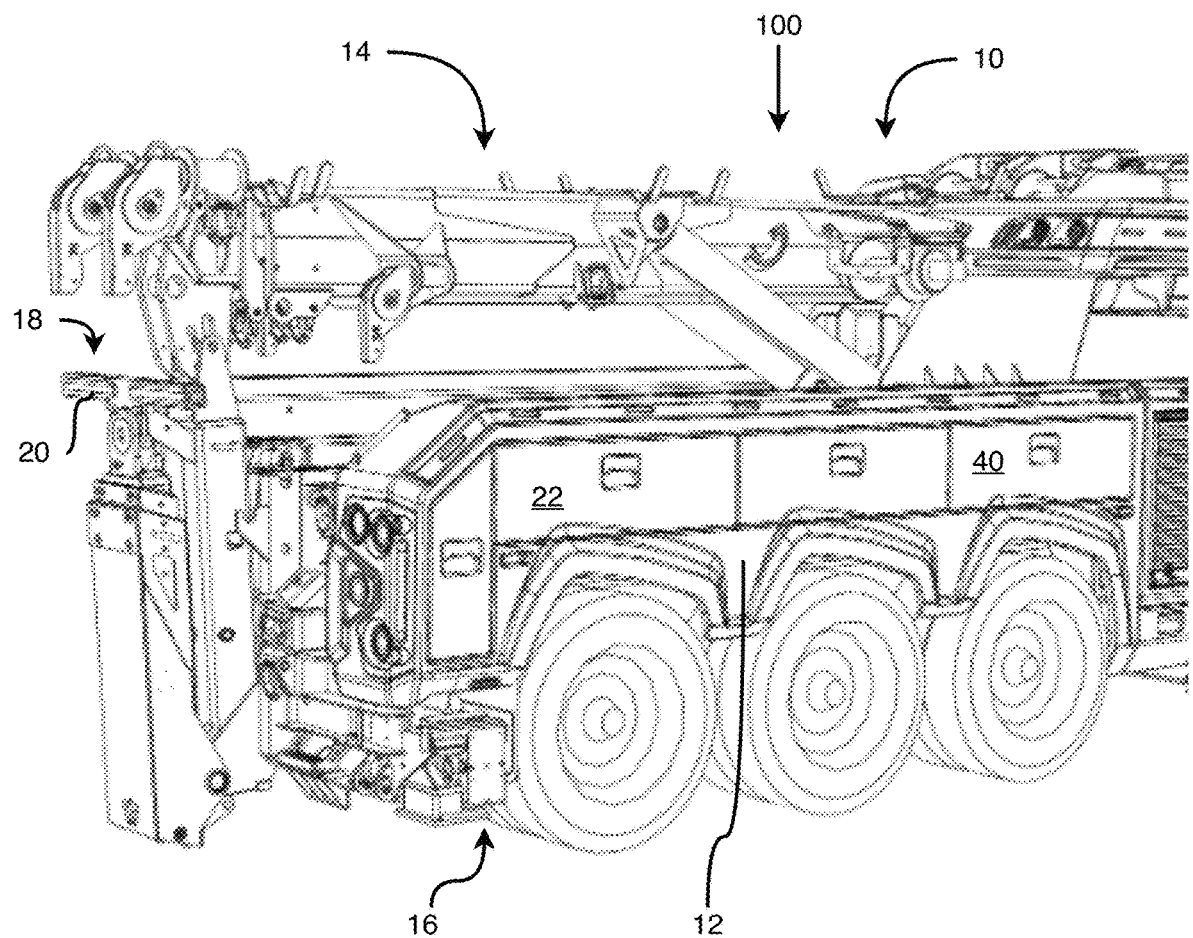
FIG. 2 is a perspective view of the rear of a wrecker in accordance with an embodiment.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "front", "rear", "interior" and "exterior" and the like are intended to be construed in their normal meaning in relation with normal operation of a wrecker.

It should further be noted that for purposes of this disclosure, the term "coupled" means the joining of two members directly or indirectly to one another. Such joining may be mechanical or not in nature. Mechanical joining may be stationary in nature or movable in nature. Joining may alternatively allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

In the present document, the term "payload" should be construed as the weight of the vehicle transported or towed by the wrecker.

In the present document, the expression "load condition" should be construed as at least one characteristic, e.g., weight, weight distribution, size of the load and the configuration of operation, e.g., mounted to a platform, partially lifted using an underlift arm, distance of the lifting position relatively to the chassis, etc., of the load with respect to the wrecker which will determine the operating limits of the wrecker.

In realizations, there are disclosed in the present description a wrecker comprising a system, which according to embodiments is either a tow weight evaluation system for dynamically assessing towed masses and the outcome of the towed masses over the performance of the wrecker, a tow aid system adapted to provide an aid to the wrecker operator in wrecker operations when towing a vehicle, and a payload evaluation system adapted to perform evaluation on the towing vehicle to determine the payload applicable to the operation of the wrecker when towing a vehicle.

Accordingly, the system is adapted to perform a method that, according to embodiments, is either a method for providing a tow aid, a method for evaluating a payload, or a method for operating a wrecker adapted to tow a towed vehicle.

Figure 3:
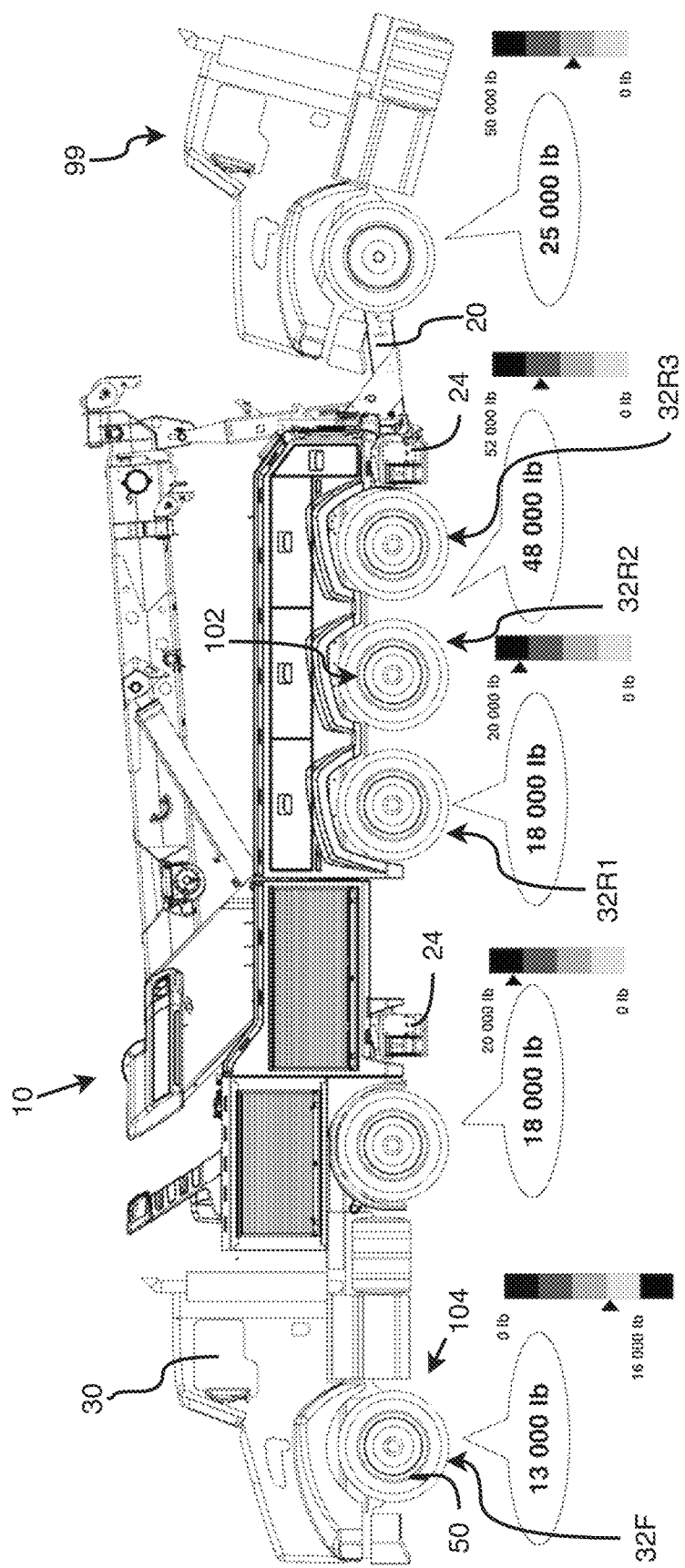
FIG. 3 is a side view of a wrecker towing a vehicle with exemplary loads indicated thereon.
Figure 4:
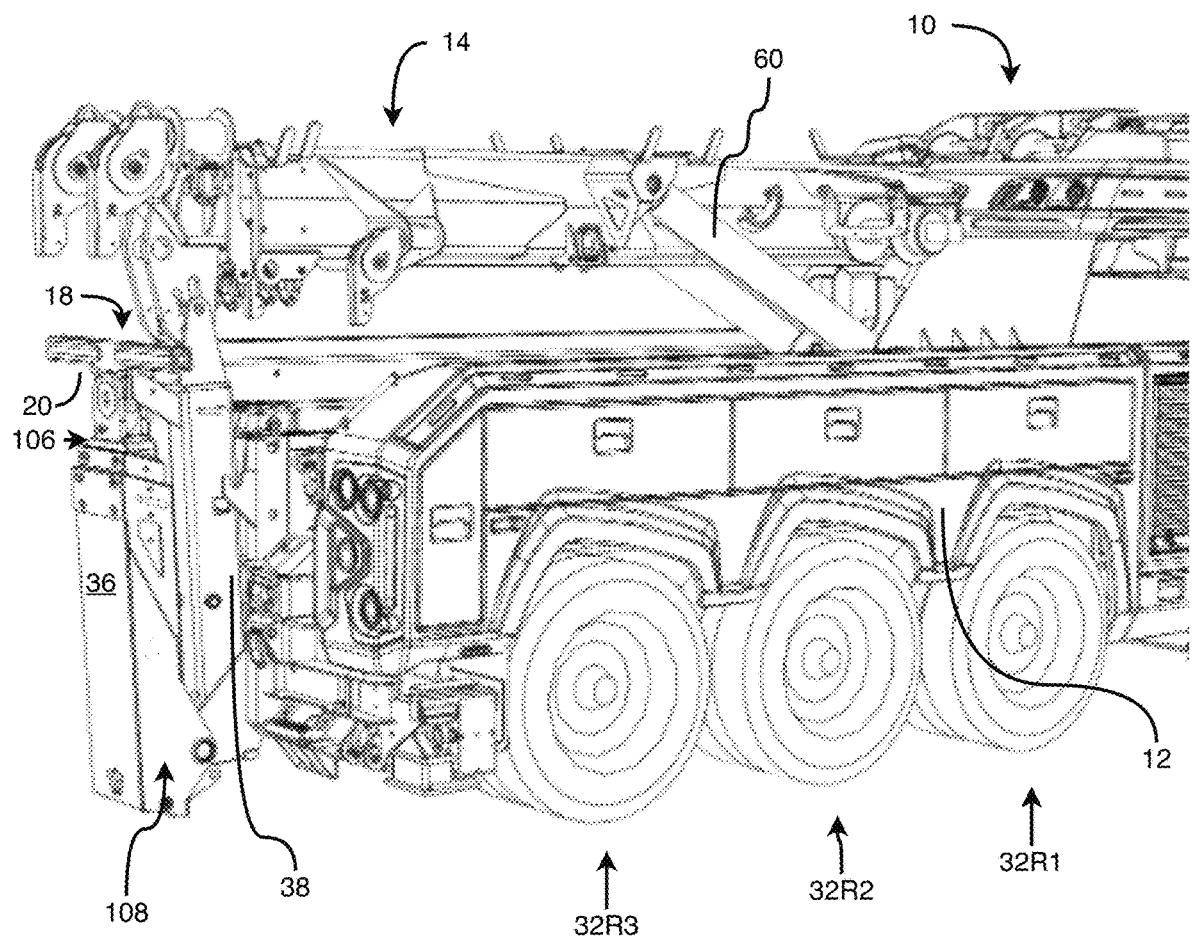
FIG. 4 is another perspective view of the rear of a wrecker in accordance with an embodiment.
Figure 7:
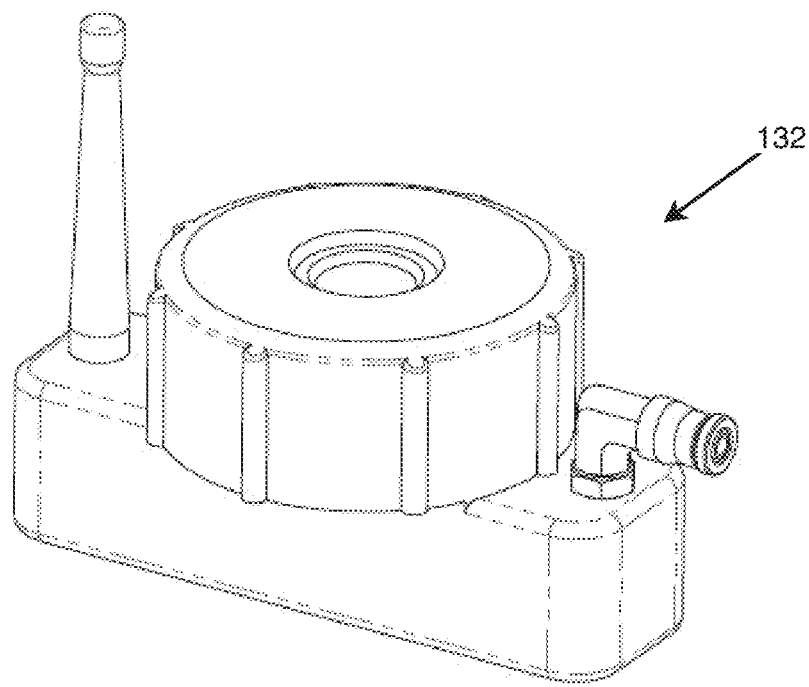
Figure 8:
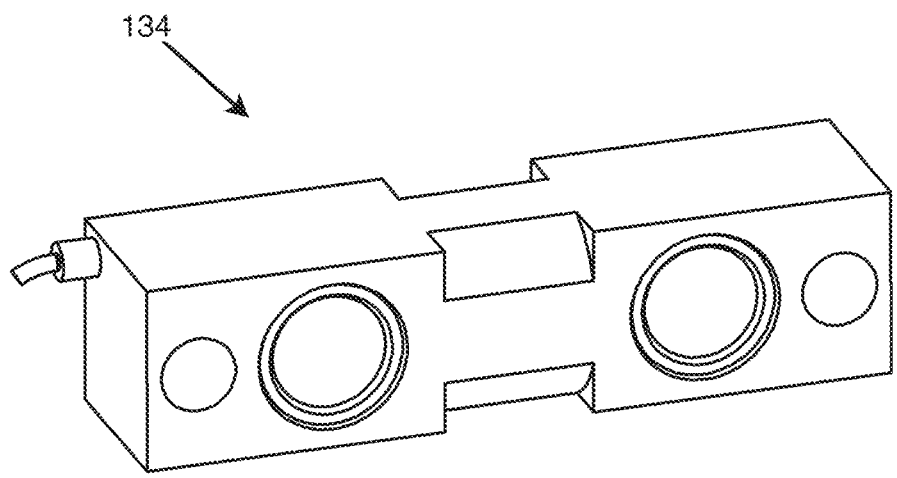
Figure 9:
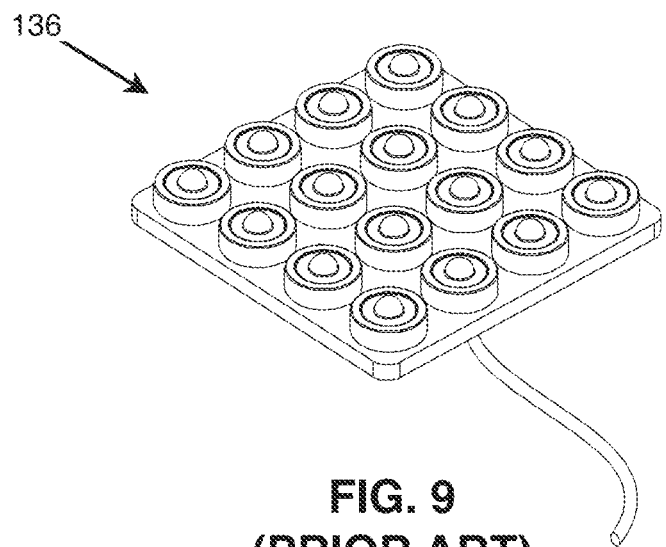
Figure 10:
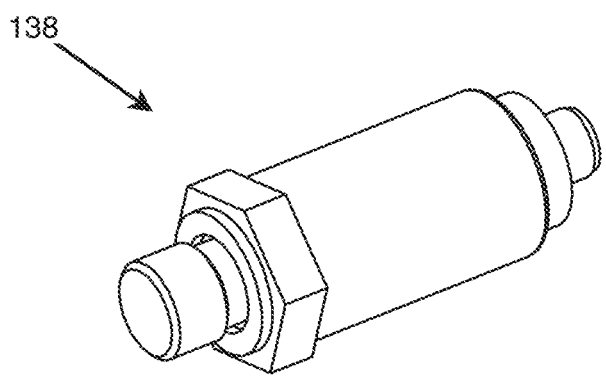
Figure 11:
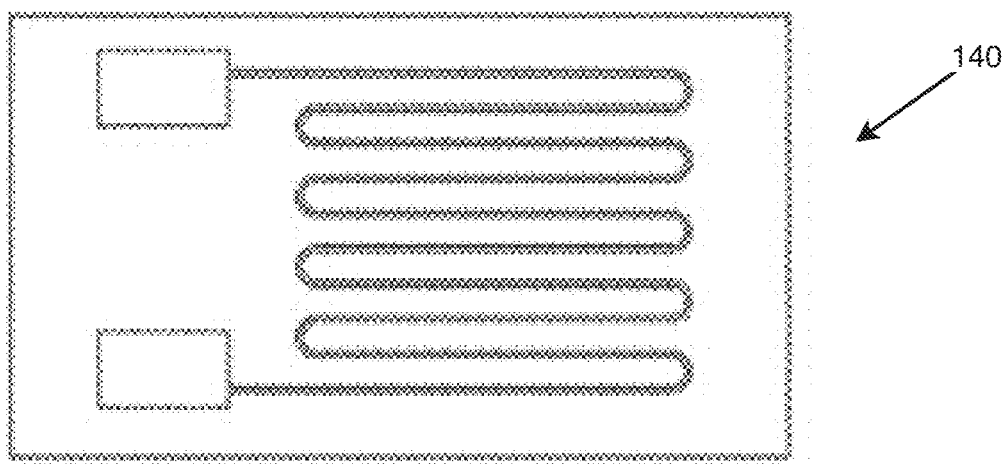
Figure 12:
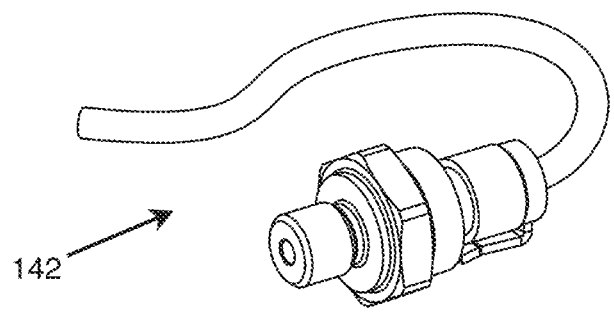
Figure 13:
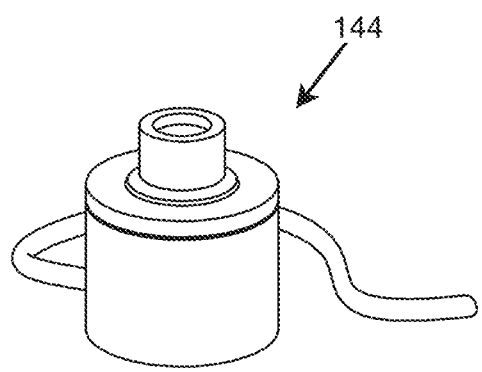

Referring now to the drawings, and more particularly to FIGS. 2, 3 and 4, the wrecker 10 comprises a body 12 mounted on a main frame, aka chassis 16. The wrecker 10 comprises a telescoping boom 14 mounted on rotating bearings, which is in turn mounted on a travel base assembly (not shown). The travel base assembly moves over travel tubes mounted on the chassis 16 along the longitudinal axis of the chassis 16 of the wrecker 10. The travel base assembly is mounted on bearing pads or alternatively on one or more traveler rollers to be able to travel over the tubes. The wrecker 10 further comprises an underlift arm 18, aka axle-lift, towing arm or underlift, mounted on the rear portion of the chassis 16 of the wrecker 10 and comprising a main arm 38. According to an embodiment, the underlift arm 18 is extendable/retractable. The wrecker body 12 comprises interior compartments along at least one of its side, the interior compartments comprising a control cabinet 40 and a tool cabinet 22. The wrecker 10 further comprises a cabin 30 from which the operator drives the wrecker 10 during towing operations.

In some realizations, the wrecker 10 comprises riggers 24 (see FIG. 3) that are extendable arms mounted to the chassis 16, wherein the riggers 24 are extended on both sides of the chassis 16 and abuttable on the ground to provide extra stability to the wrecker 10 during non-moving phases of operations. According to realizations, the wrecker 10 may comprise no rigger, two (2) riggers extending sideways (realization not depicted), four (4) riggers (see two (2) of the four (4) riggers 24 shown on FIG. 3) extending sideways, and/or longitudinal riggers (realization not depicted) extending rearward and/or frontward. In some realizations, some riggers may not be able to extend away from the chassis 16 but rather be able only to extend and abut the ground below the chassis 16, thereby releasing some weight over the wheels 50 (see FIG. 3) and provide extra stability since the riggers 24 are usually rigid parts that do not allow displacement, in opposition to components, e.g., tires of the wheels 50, comprising inflated elastomer material.

As shown in FIG. 3, the wrecker 10 comprises a plurality of axles, among which one or more front axles 32F (herein generically referred to as 32F and depicted as a single front axle 32F) and a plurality of rear axles 32R (herein generically referred to as 32R and depicted as a first rear axle 32R1, a second rear axle 32R2 and a third rear axle 32R3).

Wreckers 10 differ from each other in the number of front axles 32F and rear axles 32R, and the physical characteristics of the wrecker 10 such the distribution of mass of the wrecker 10 without payload on the front axles 32F and the rear axles 32R, the wheelbase of the wrecker 10, and the maximum capacity of some particular components of the wrecker 10 to particular types of loads (e.g., operating range of the chassis 16 under load, maximum lifting capacity of underlift arm 18, operating range under load of the underlift arm 18).

Further, the operating conditions of a same wrecker 10 differ from one operation to the other based on the equipment mounted to the wrecker 10 at the time, the locations of the removable, movable and fixed equipment on the wrecker 10, and the environmental conditions (e.g., longitudinal and transversal angles of operations of the wrecker 10).

One realization of the tow weight evaluation system 100 comprises a front-axle load sensor 104 mounted to the front axle 32F. The front-axle load sensor is mounted such as to sense the load exerted by the front axle 32F.

Referring additionally to FIGS. 5 and 6, the tow weight evaluation system 100 further comprises a rear-axle load sensor 102 mounted to at least one of the rear axles 32R. As depicted on FIG. 5, the number of rear-axle load sensors 102 may be the same as the number of rear axles 32R or to the number of damping components. Thus, the load sensors 102, 104 are distributed distant from each other according to different longitudinal positions along the chassis 16.

It is worth noting that many solutions are currently available for sensors and gauges, a.k.a. scales, able to sense loads associated with an axle or another structure of a wrecker 10. FIGS. 6 to 14 and 16 provides examples of such solutions, comprising air suspension sensors 132 (aka pneumatic pressure sensor, FIGS. 6 and 7), a range of mechanical sensors such as the mechanical sensors 134 and 136 of FIGS. 8 and 9, hydraulic pressure sensors 138 (FIG. 10) and strain gauges used to evaluate strains thus indirectly loads.

Referring additionally to FIG. 4, the tow weight evaluation system 100 comprises one or more sensors associated with the underlift arm 18. One of these sensors is a tow lift sensor 106 mounted to the underlift arm 18 that is adapted to detect the mass lifted by the wrecker 10.

According to realizations, the nature and position of the tow lift sensor 106 may vary. According to a realization, the tow lift sensor 106 comprises a strain gauge 140 (see FIG. 11) mounted to a portion of the underlift arm 18. According to another realization, the tow lift sensor 106 comprises a pressure sensor 142 (see FIG. 12) mounted to a hydraulic component 60 (not depicted, similar to hydraulic jack, FIG. 4) driving the underlift arm 18 between positions, and particularly driving the underlift arm 18 in the lifted position. According to one embodiment, the hydraulic component 60 comprises one or more hydraulic jacks.

According to a realization, the tow lift sensor 106 further comprises a strain gauge 140 (see FIG. 11) sensing strain under load of the underlift arm 18 during its operation.

According to a realization, the tow lift sensor 106 further comprises an angular detection sensor 144 (see FIG. 13) to detect the angle of operation of the underlift arm 18.

Referring particularly to FIG. 4, the underlift arm 18 is adapted to operate in a plurality of positions, in other words spatial geometries, comprising a plurality of heights of the underlift arm 18 and a plurality of extensions of telescopic arm 36, wherein extension of the telescopic arm 36 is performed through telescopic structures of the underlift arm 18. The tow weight evaluation system 100 further comprises a telescopic-arm extension sensor 108 adapted to detect the length or, in other words, extension distance of the underlift arm 18, aka the lifted position of the towed vehicle 99 (FIG. 3), rearward from the chassis 16 of the wrecker 10 during its operation.

According to a realization, the telescopic-arm extension sensor 108 comprises an optical sensor 146 (see FIG. 14) mounted to the chassis 16 of the wrecker 10 and determining the distance of the attachment component 20 of the underlift arm 18 from the chassis 16 during the towing operation.

According to a realization, the wrecker 10 comprises sensor(s) mounted to one or more hydraulic actuators driving movements (e.g., position, orientation, elevation and length) of the telescopic boom 14 to monitor the loads exerted by the telescopic boom 14, and more generally by the wrecker, when the telescopic boom 14 is operated to lift or haul a load.

Such as with the loads exerted when operating the underlift arm 18, it is useful to monitor the loads exerted on the telescopic boom 14 to provide more secure conditions of operations that vary from operation to operation.

The tow weight evaluation system 100 further comprises a processing component 110 (FIG. 5) receiving signals from the axle sensors (front axle sensor and rear axle sensor(s) 102) and the sensor(s) associated with the underlift arm 18 (the tow lift sensor 106 and/or the telescopic-arm extension sensor 108). Mounted to the wrecking equipment or in the cabin 30, or alternatively as a wireless remote device 148 (see FIG. 15) (e.g., smart phone with communication and app designated therefor or the like), and a display component 120 (FIG. 5) is in wired or wireless communication with the processing component 110.

The processing component 110 is adapted to process dynamically the signals from the sensors and to process the signals into significant operating information for the operator, information that is displayed on the display component 120 as a visual aid (FIG. 18) used by the operator in the operation of the wrecker 10. The visual aid shows operating limits for various operating criteria such as: payload on the underlift arm, speed of the wrecker, load on the rear axle(s) and load on the front axle(s).

Useful operating information comprises the payload supported by the underlift arm 18 with the geometry of the underlift arm undergoing the payload influencing the maximum payload the underlift arm 18 may accept. The momentum and/or the internal forces undergone by the sub-components of the underlift arm 18 are function of both the scale of the payload and the geometry of the underlift arm 18 when supporting the payload, and particularly the distance from the chassis 16 (or rear of the wrecker 10) on which the payload is effectively supported, aka extension of the underlift arm 18. Accordingly, both a maximum value for the payload is set and a maximum value for the geometry of the underlift arm 18, aka a maximum extension, is set based on the detected effective payload.

Useful operating information further comprises a minimum load on the front axle(s) 32F, with the effective load on the front axle(s) 32F being influenced directly by the configuration of the wrecker 10, the distribution of the normal charges on the wrecker 10, aka wrecker weight distribution, the scale of the effective payload and the geometry of the underlift arm 18 supporting the effective payload. Practically, an increase in the effective payload and in the extension of the underlift arm 18 decreases the effective load on the front axle(s) 32F.

Useful operating information further comprises a maximum load on at least one of the rear axle(s) 32R, with the effective load on the rear axles(s) 32R being influenced by the same factors as the effective load on the front axle(s) 32F identified before. Practically, an increase in the effective payload and variation in the extension underlift arm influences the effective load on the rear axle(s) 32R.

Useful operating information further comprises a maximum speed of the wrecker 10 when moving the towed vehicle, wherein the maximum speed is influenced by the effective payload, the geometry of the underlift arm 18, and the effective loads on front axle(s) 32F and rear axle(s) 32R.

Practically, a front axle 32F undergoing a load under a minimum value results in less potential traction, aka a decrease of the engagement of the front wheels with the ground that, when applied to a steering axle, is a risk of a dangerous decrease in the capacity of the operator to efficiently steer the wrecker 10. Conversely, an axle submitted to a load over a maximum, results in the tires mounted to that axle potentially exceeding a designed maximum pressure, which increases the risks of tire explosion. Such risks further increase as the speed of the wrecker 10 increases, thereby raising the temperature of the tires.

Figure 18:
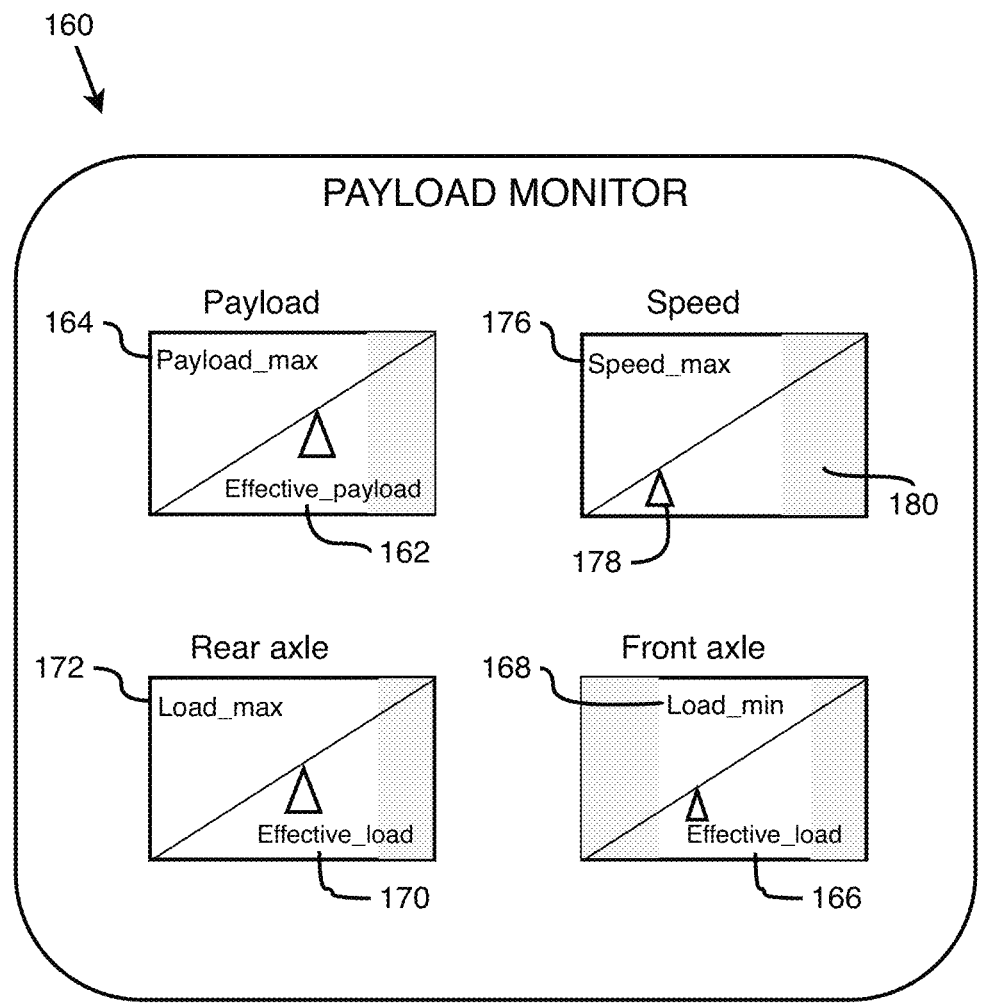
FIG. 18 is a schematic diagram of a visual aid used by an operator in the operation of a wrecker, in accordance with an embodiment.

Referring additionally to FIG. 18, the information displayed on a visual aid 160 may comprise a series of values, including at least a portion of the following: the effective payload 162, the maximum payload 164, the minimum load 168 on the front axle(s) 32F, the effective load 166 on the front axle(s) 32F, the maximum load 172 of the rear axles 32R, the effective load 170 on the rear axles 32R or on the rear axle 32R undergoing the highest effective load, and a maximum speed 176 which should not be exceeded by the wrecker 10 under the current operating condition. The exemplary visual aid 160 may display only limit values (maximum and minimum values 164, 168, 172 and 176). The exemplary display 160, as depicted, may further display effective values (162, 166, 170) with the effective values being displayed either numerically, graphically or numerically and graphically (as depicted). The graphical representation may comprise the use of indicators 178 being at a certain distance of the reference indicator, depicted as the limit of grey areas 180 to be construed as out-of-range areas, referring to a maximum or minimum value depending on the information.

According to embodiments, the data collected by the sensors are processed. According to one embodiment, the processing and calculating is performed using the following formulas:

Known values:
d: distance between the rear axle and the axle-lift
Wb: wheel base of the wrecker
Data collection from sensors and data processing required to be registered before performing the wrecking operation:
x: the load on the front axle(s) (i.e., tare weight on the front axle(s))
y: the load on the rear axle(s) (i.e., tare weight on the rear axle(s))
Twb: total weight of the wrecker $$Twb=x+y$$

Note that before loading the axle-lift, a print (or a record) of the values of the loads on the axles must pe performed.

Data and processing required after loading the axle-lift:
Front axle load=x+a, where a is the weight variation on the front axle(s)
Rear axle load=y+b, where b is the weight variation on the rear axle(s)
Total weight: Twa $$Twa=x+a+y+b$$

Load axle lift (aka underlift): Lal $$Lal=Twb-Twa=x+y-(x+a+y+b)->Lal=a+b$$

Length of the axle-lift: L $$L=(Wb*a/Lal)-d$$

According to a realization, the tow weight evaluation system 100 receives data from the sensors associated with the telescopic boom 14.

According to a realization, the tow weight evaluation system 100 may further comprise operating condition sensors 150 (e.g., odometer sensor (aka speed sensor), see FIG. 16, and accelerometers) adapted to sense operating conditions in which the wrecker 10 operates, such as the speed, the longitudinal and tangential operating angles of the wrecker 10, etc. Such operating conditions may be collected for instance using accelerometers mounted to the chassis 16 of the wrecker 10, or otherwise. The signals transmitted by the operating condition sensors help evaluating the current conditions of operation, as well as changes in the conditions of operation of the wrecker 10 during a towing operation.

The information displayed on the display component 120 may further comprise the speed-related data (e.g., a speed limit) and/or road-angle data indicative of operation limits to satisfy during the operation, and more specifically the driving of the wrecker 10 with the towed vehicle 99 attached at the rear of the wrecker 10 or mounted to the platform of the wrecker 10. Information on the speed-related data and/or road-angle data are important in the operation of the wrecker 10 since the boundary conditions of operation of a wrecker 10 are not the same when immobile, moving at low speed or when moving at great speed. An increase in the speed of the wrecker 10 is associated with increased risks resulting from the increase of the breaking distance, the heating of the tires, the increased effect of loads on the dampers, the increased effect of an unbalanced load, etc.

The processing component 110 may further take into account variations of the data as the wrecker 10 is in movement to determine vibrations and other physical characteristics of the wrecker 10 undergoing a towing (or mounted) load that may change the operating limits of the wrecker 10.

In summary, the processing component 110 collects raw sensor data, transforms raw data into aid data to the operator. The processing component 110 may further perform mathematical operations on the sensor data to transform the data into physically significant data (e.g., angular sensor data and load data into significant lift data and weights), and may perform derivative and/or integral processing on the data to filter results, evaluate results and/or extrapolate conditions resulting from changes in the operating conditions (e.g., speed of the wrecker 10, angle of the road, uneven state of the road, etc.)

According to a realization, the processing component 110 further operates with memory 112 adapted to store the program for processing the sensor signals. The memory 112 may further store wrecker specifications, aka wrecker physical characteristics, used by the program to correctly interpret the sensor signals into wrecker's specific data. The memory 112, under control of the program, may further store the sensor data or analytic data resulting from the processing of sensor data. The memory 112 may store a log of operating conditions accessible for wrecker maintenance, in case of accident or malfunction of the wrecker 10, or by authorities for examples.

According to realizations, the processing component 110 may further be connected to interlock components of the wrecker 10. The interlock components defining an interlock system, functionally connected to operating components of the wrecker 10, would dynamically limit operating conditions (e.g., speed) of the wrecker 10 based on the processing of the sensor signals, thus based on the sensing by the sensors of the load exerted by the wrecker 10 resulting from the towing of the towed vehicle 99, the towing conditions (e.g., extension of the underlift arm 18) and on characteristics of the wrecker 10 (e.g., load on the axles without payload and distribution of the load over the axles without payload). According to the limits imposed on the operating conditions, the interlock system would apply these limits to prevent the wrecker 10 from moving when outside of the operating conditions according to the actual load conditions.

According to a realization, the processing component 110 may further be connected to alarm components. The alarm components are adapted to provide alarm signals (e.g., visual alarm signals through a display component, audio alarm signals through audio signal component) when the operating conditions get close to the operating limits and/or when exceeding the operating limits as established by the processing component 110.

Therefore, according to a perspective, the evaluation system 100 is adapted for a wrecker 10 comprising a chassis 16, axles (e.g., front axle(s) 32F and rear axles 32R) mounted the chassis 16 through which the chassis 16 engages the ground, and a underlift arm 18 adapted to be attached to a load (e.g., a towed vehicle) whereby the wrecker 10 is adapted to move the load.

The tow weight evaluation system 100 comprises a plurality of chassis sensors (e.g., front-axle load sensor 104 and rear axle load sensor(s) 102) mounted longitudinally to the chassis 16 distant from each other, wherein the chassis sensors 102, 104 are generating chassis-related signals indicative of ground engagement loads (load on the axles 32F and 32R).

The tow weight evaluation system 100 comprises an underlift arm sensor (e.g., tow lift sensor 106, strain gauge 140, hydraulic pressure sensors 138) mounted about the underlift arm 18 and adapted for sensing and measuring at least one of: a) load applied on the underlift arm 18 to hold a load (i.e., a vehicle in a towing position); b) strain undergone by the underlift arm 18; c) spatial configuration of the underlift arm 18; and d) forces exerted or undergone by a component of the underlift arm 18.

Accordingly, the underlift arm sensor is generating arm-related signals indicative an operating condition of the underlift arm 18.

The tow weight evaluation system 100 comprises a controller (processing component 110 and memory 112) processing chassis-related signals and arm-related signals and generating a visual aid relative to operation of the wrecker 10 and a display (display component 120) for displaying the visual aid to an operator.

Figure 17:
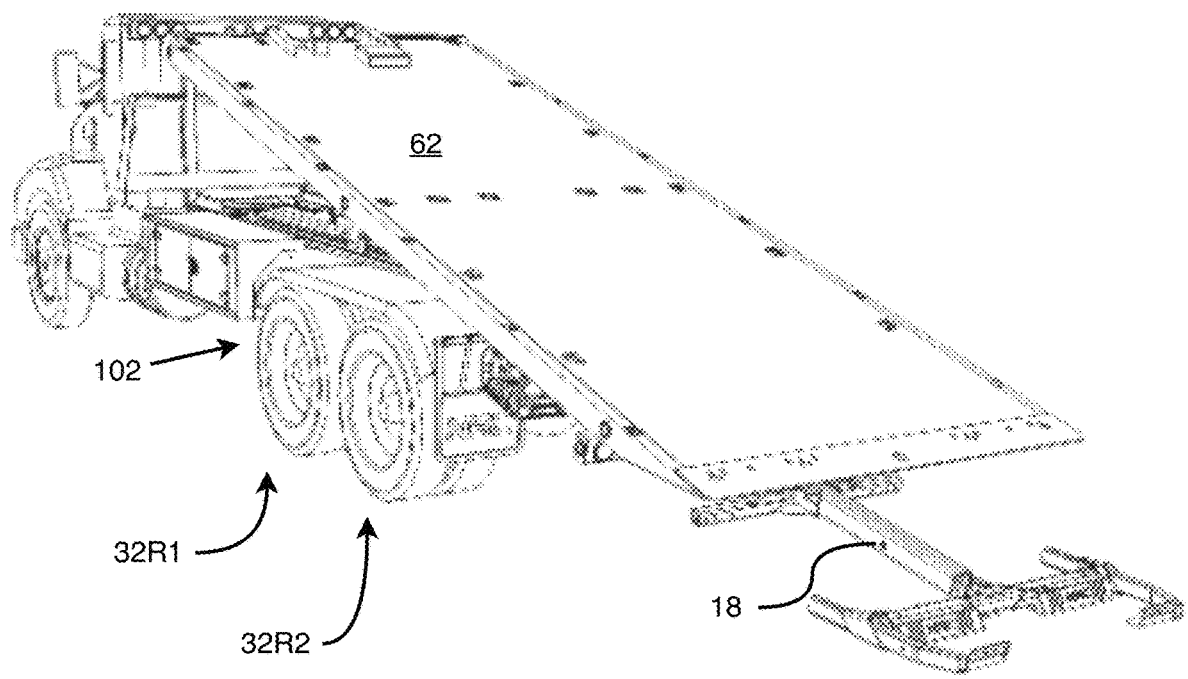
FIG. 17 is a perspective view of the rear portion of a wrecker comprising a platform.

Referring now particularly to FIG. 17, according to a realization, the system is mounted on a towing vehicle comprising a platform 62, for example a carrier or a flatbed vehicle. The towing vehicle (only the rear portion of the towing vehicle depicted thereon) is adapted to transport a towed vehicle. The towing vehicle comprising a frame, one or more front axles, one or more rear axles 32R and a platform 62 supported by the frame. For towing, the towed vehicle is temporarily mount and secured to the platform 62. In this realization, the tow weight evaluation system comprises a load sensor mounted about the front axle(s) for generating signals indicative of the load exerted on the front axle(s). The tow weight evaluation system further comprises at least one rear axle load sensor 102 mounted about at least one of the rear axles 32R for generating signals indicative of the load exerted on the rear axle 32R. The tow weight evaluation system also comprises a controller processing signals generated by the sensors and computing loads exerted by all of the axles and the platform, and a display, in communication with the controller, for displaying a visual aid to an operator based on the processed signals.

According to a realization, a method of operating a wrecker comprising a tow weight evaluation system comprises: a) having sensors sensing i) a load exerted on the wrecker by a towed vehicle, ii) a lifted position of the towed vehicle relative to the wrecker, and iii) exerted loads on at least one axle of the wrecker and generating signals accordingly; b) having a controller processing signals generated by the sensors into data providing an aid for the operation of the wrecker when towing the towed vehicle; and c) having a display component displaying the data on a display providing aid to an operator to operate the wrecker when towing the towed vehicle.

According to a realization, a method of operating a wrecker comprising a tow weight evaluation system comprises: a) having sensors sensing i) a load exerted on the wrecker by a towed vehicle, ii) a lifted position of the towed vehicle relative to the wrecker, and iii) exerted loads on at least one axle of the wrecker and generating signals accordingly; b) having a controller processing signals generated by the sensors into data providing an operating range, aka safety range, for the operation of the wrecker when towing the towed vehicle; and c) having the controller in communication with interlock components of the wrecker, wherein the controller is adapted to provide a signal resulting in the operation of the wrecker being dynamically limited to operating within the operating range.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A tow aid system used while operating a wrecker adapted to tow a vehicle, the wrecker comprising an underlift arm extending rearward from the wrecker, wherein the underlift arm is adapted to lift at least a part of the vehicle for towing, the tow aid system comprising:
    axle load sensors mounted along different longitudinal positions on the wrecker, the axle load sensors generating signals indicative of loads along the different longitudinal positions;
    an underlift arm sensor mounted about the underlift arm, the underlift arm sensor generating signals indicative of at least one of a load applied on the underlift arm and an extension distance of the underlift arm while holding the vehicle in a towing position; and
    a controller processing the signals from the axle load sensors and the underlift arm sensor to calculate load conditions and to determine whether the load conditions are within operating limits of the wrecker.

2. The tow aid system of claim 1, wherein the controller further processes signals from the axle load sensors and the underlift arm load sensor to calculate load conditions of the wrecker which comprise at least one of effective payload on the underlift arm, effective load on a front axle and effective load on a rear axle.

3. The tow aid system of claim 2, wherein the controller further processes signals from the axle load sensors and the underlift arm load sensor to calculate the operating limits of the wrecker which comprise at least one of: maximum underlift arm payload weight, minimum front axle weight, maximum front axle weight, maximum rear axle weight and maximum speed of the vehicle.

4. The tow aid system of claim 3, wherein the tow aid system further comprises a display for displaying at least one of the load conditions and the operating limits.

5. The tow aid system of claim 3, wherein the tow aid system further comprises a speed sensor to detect the speed of the vehicle and wherein the tow aid system further comprises an audio signal component to provide an audio alarm when load conditions or speed are outside the operating limits.

6. The tow aid system of claim 3, wherein the wrecker further comprises a front axle on which is mounted a front axle load sensor and a rear axle on which is mounted a rear axle load sensor.

7. The tow aid system of claim 6, further comprising a register storing over time a log of at least one of:
tare weights at each load sensor;
the load conditions;
the loads on the front axle;
the loads on the rear axle; and
the loads on the underlift arm.

8. The tow aid system of claim 1, further comprising an interlock system limiting speed of the wrecker based on the calculated operating limits.

9. The tow aid system of claim 1, wherein the sensors comprise at least one of a pneumatic pressure sensor, a hydraulic pressure sensor, a strain gauge and an angular detection sensor.

10. A method for providing an aid for operating a wrecker adapted to tow a vehicle wherein the wrecker comprises a front axle, a rear axle and an underlift arm, the underlift arm extending rearward from the wrecker, wherein the underlift arm is adapted to lift at least a part of the vehicle for towing, the method comprising:
 a) generating sensor signals representative of:
  i) a load on exerted by the vehicle on the underlift arm;
  ii) an extension distance of the underlift arm; and
  iii) a load exerted on at least one of the front axle and the rear axle; and
 b) processing the sensor signals to calculate load conditions and to determine whether the load conditions are within operating limits of the wrecker under the load conditions.

11. The method of claim 10, further comprising: at least one of:
displaying at least one of the load conditions and the operating limits; and
limiting at least one of speed of the wrecker and position of the underlift arm.

12. The method of claim 10, further comprising storing over time in a memory a plurality of load conditions undergone by the wrecker.

13. The method of claim 10, wherein the step of processing the sensor signals to determine whether the load conditions are within the operating limits comprises calculating at least one of maximum underlift arm payload weight, minimum front axle weight, maximum front axle weight, maximum rear axle weight and maximum speed of the vehicle.

14. The method of claim 10, wherein the step of processing the sensor signals to calculate load conditions comprises determining at least one of effective payload on the underlift arm, effective load on the front axle and effective load on the rear axle.

15. The method of claim 10, wherein the step of limiting a speed of the wrecker comprises preventing the wrecker from moving unless the speed of the wrecker or the load conditions are within the operating limits.

16. The method of claim 10, wherein the step of processing signals comprises the step of calculating a total weight of the wrecker before the vehicle is lifted by the underlift arm, calculating a total weight when the vehicle is lifted by the underlift arm, and at least one of:
 i) calculating a load axle lift; and
 ii) calculating a length of the axle lift.

* * * * *